March 20, 1945.　　A. G. LIEBMANN　　2,371,630
CARTRIDGE CONTAINER
Filed June 18, 1943　　3 Sheets-Sheet 1

August G. Liebmann
Inventor

March 20, 1945.　　A. G. LIEBMANN　　2,371,630
CARTRIDGE CONTAINER
Filed June 18, 1943　　3 Sheets-Sheet 2

August G. Liebmann
Inventor

March 20, 1945.  A. G. LIEBMANN  2,371,630
CARTRIDGE CONTAINER
Filed June 18, 1943   3 Sheets-Sheet 3
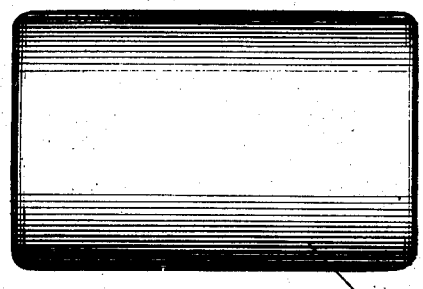
Fig. 17
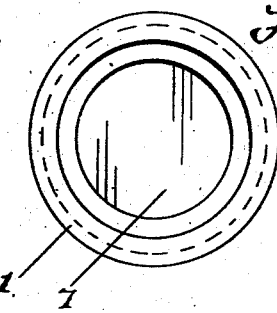
Fig. 18
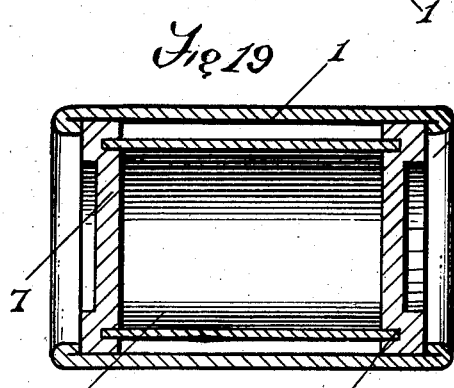
Fig. 19  Fig. 22
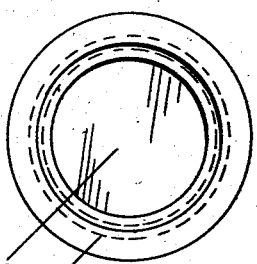
Fig. 20
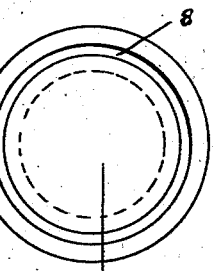
Fig. 21
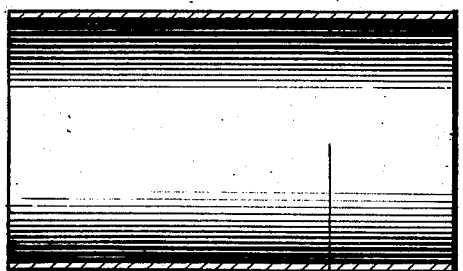
Fig. 24
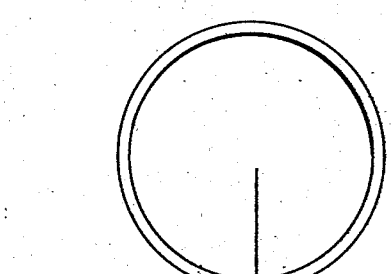
Fig. 23
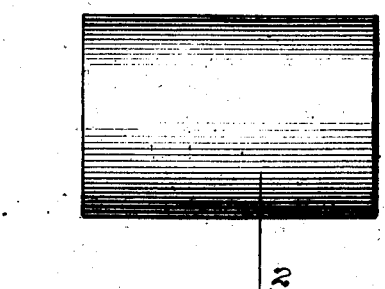
Fig. 25
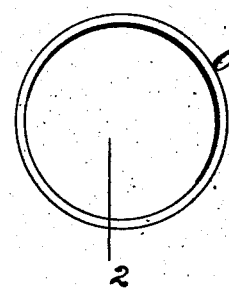
August G. Liebmann
Inventor Patented Mar. 20, 1945

2,371,630

UNITED STATES PATENT OFFICE 2,371,630

CARTRIDGE CONTAINER

August G. Liebmann, Washington, D. C., assignor of one-half to Harry A. Blessing Application June 18, 1943, Serial No. 491,365

6 Claims. (Cl. 229—5.5)

This invention pertains to cartridge containers, and more particularly to an improvement in insulated containers of the type comprising an inner and outer wall with dead air spaces between the walls, as disclosed in a copending application Serial No. 472,640, filed Jan. 16, 1943. The ordinary container form now in general use is a single walled boxlike structure, with paraffined or glassine paper lining encasing the contents within the containers.

I am aware that the principles of plural walls with spaces between walls are old in the art, of partial vacuum bottles, and while it is contemplated that the dead air spaces of the walls may be supplanted with other forms of gas, the conventional material of paper products in this instance would hardly permit of vacuum principles owing to the atmospheric pressure which would collapse the container.

In all such previous disclosures in the prior arts, the spaces are at the side walls and the bottom and do not cover the top end wall for reason of orifice for dispensing.

Vacuum types are precluded for purely economic reasons as in the first instance, the container material must be cheap enough to waste. It is therefore the aim of the present invention to provide a container so constructed that, it may sustain a maximum of end pressure, the side pressure being negligible in the majority of sizes used, and modified in the larger sizes by having corrugated walls to sustain side pressure in addition to that of the end pressure in packing, handling and shipping.

Another object of the invention is to so arrange the inner and outer walls in telescopic relationship and to affix corresponding end closures to seal the same and provide such spaces between the side and end walls. The mechanics of sealing the containers as already disclosed, prevents crushing or pulping the dehydrated food charge to be the contents. Research has disclosed that the popular demand and use of dehydrated food requires packaging to prevent pulping as in this invention. The industry requests and requires this type of packaging, so that when dehydrated vegetables are cooked ready to serve they will in appearance simulate wet packed foods encased in tin coated metallic containers, the present invention is therefore a substitute for the metallic containers in dispensing such foods to the consumer public. Pulped food, concentrated into bricks or tablets, is merely an emergency ration system and the consumer public will not utilize such non-appetizing foods while they can get wet packed tinned foods and properly packed dehydrated foods, the latter being the object of the present invention.

The insulated feature of double walls and intervening dead air spaces provide the containers with the required safeguard against premature absorption of moisture which induces molds and renders the contents unfit for food. Thus sanitary freshness is insured for protracted periods between the growing seasons of the year.

To open the containers disclosed in the present invention a sharp knife or ordinary can opener may be used to cut through the crimped portion of the side wall, or laterally through the end wall.

In the accompanying drawings,

Figures 17 to 25 inclusive show substantially similar elements for another modified form of container to be pressed from plastic cellulose material properly treated for pressing purposes.

Figure 1:
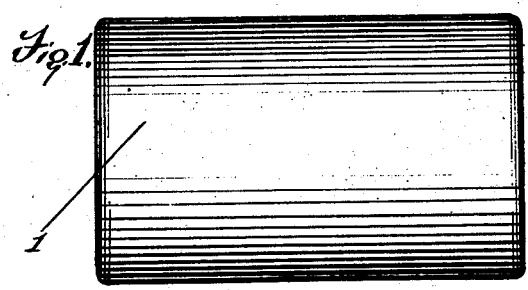
Figure 1 is a longitudinal side elevation of the preferred form of container of ordinary dimensions.
Figure 2:
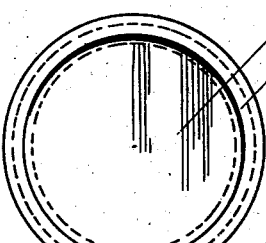
Figure 2 is a closed end view of the same.

This form may include plastic end walls with paper side walls, which may be coated with nonpoisonous Bakelite varnishes used and old in the art for such purposes.

The finished and packed container being dipped in paraffin to render them moistureproof, the elements of the modified forms are substantially equivalent structures of the preferred forms except as noted.

Reference now being had to the numerals of the preferred form, the outer tube 1 of the container is adapted to receive an interfitting tube 2 having upset or deformed ends 3 in effect spacing collars, a closure 4 having upset or deformed flanges 5 are adapted to register on their flat sides with the ends of the inner tube 2 and interfit within the bore of the outer tube 1. The disc end closure 6 is adapted to register with the flanges of the disc 5 and the whole assemblage locked in fixed and sealed position by means of folding or crimping inwardly the ends of the outer tube 1 which bear upon the end closure disc 6.

The numerals, Figures 9 to 16 inclusive, are for a modified form of container hereinafter described, as well as numerals, Figures 17 to 25 inclusive, are for another modified form, both of which are more fully and hereinafter described.

In the modified form, Figures 9 to 16 inclusive, equivalent elements are employed, and numerals relate to the preferred form as well as the modified form.

Figure 3:
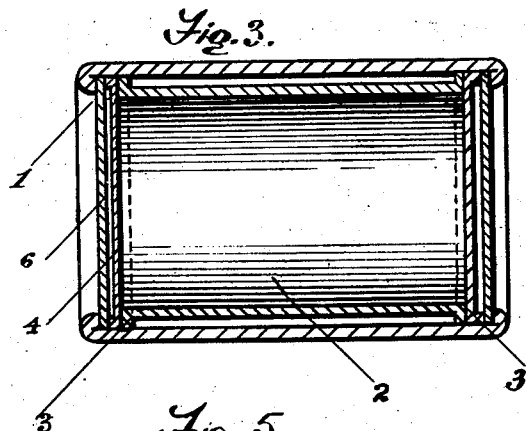
Figure 3 is a cross section of Figure 1 of its longitudinal axis.
Figures 4, 4A:
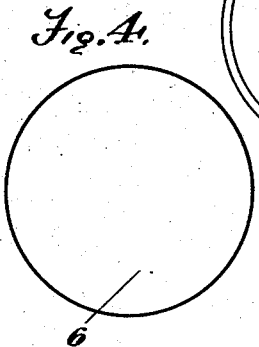
Figure 4 is the outer disc end closure.
Figure 4A is a top plan view of the flanged disk.
Figure 5:
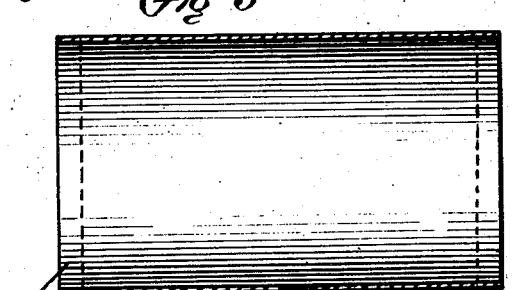
Figure 5 is the outer tubular piece, comprising a cross section of the same through its longitudinal axis.
Figures 6, 8:
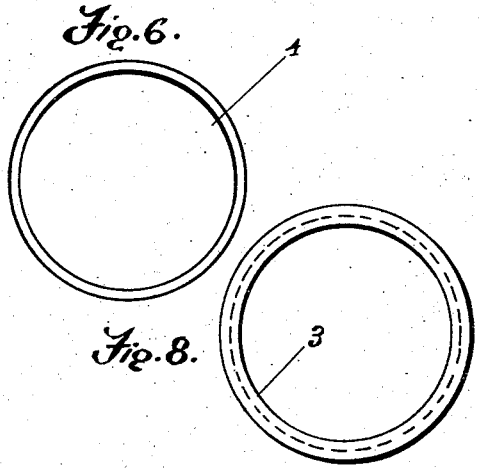
Figure 6 is an end view of aforesaid open end tube.
Figure 8 is an open end view of Figure 7.
Figure 7:
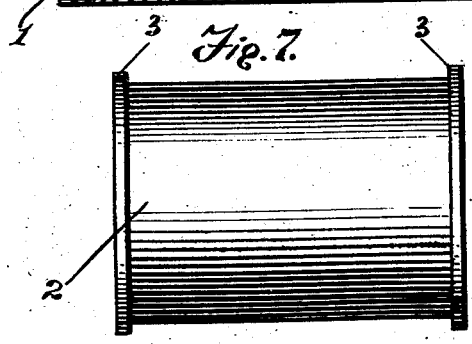
Figure 7 is a longitudinal side elevation of the inner tubular piece having flanges deformed at its ends.
Figure 9:
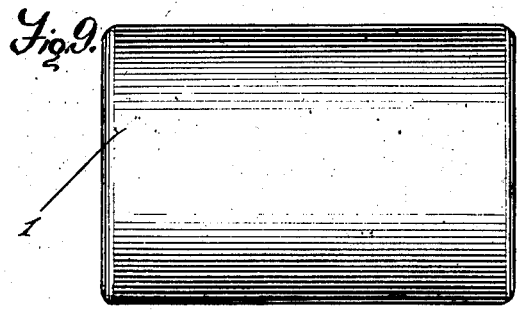
Figure 9 is a longitudinal side elevation of a modified form of container of ordinary dimensions.
Figure 10:
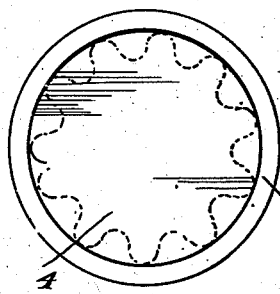
Figure 10 is a closed end view of the same.
Figure 11:
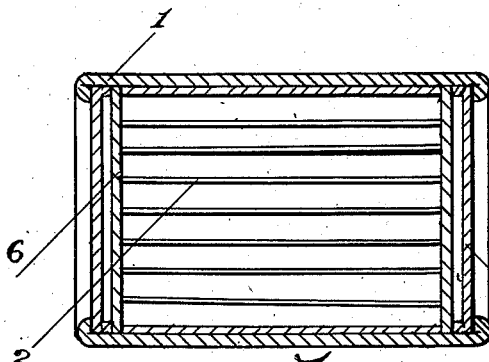
Figure 11 is a longitudinal cross section taken at the axis of Fig. 9.
Figure 12:
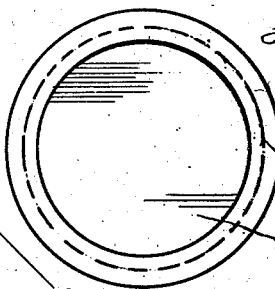
Figure 12 is the outer disc end closure, with the disc flange disposed inwardly and similar to the disc end closure, Figure 3, of the preferred form, the disc flange of the latter being disposed outwardly.
Figure 13:
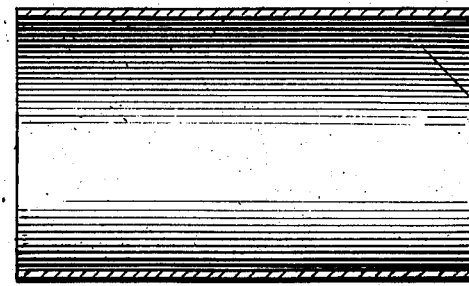
Figure 13 is the outer tubular piece, comprising a cross section of the same taken through its longitudinal axis.
Figure 16:
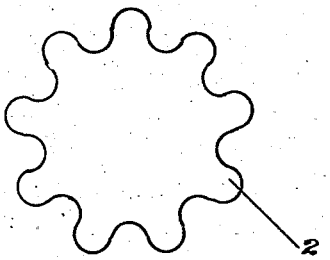
Figure 16 is an open end view of the same.
Figure 15:
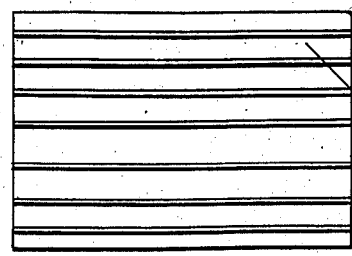
Figure 15 is a longitudinal side elevation of the inner tubular piece having corrugated surfaces.
Figure 14:
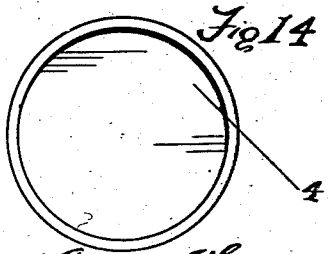
Figure 14 is an end view of aforesaid open end tube.

The outer tube or shell 1, is adapted to receive an interfitting corrugated tube 2, an end closure disk 6, is disposed upon the ends of said corrugated tube, and the end closure 4 having upset flanges 5 thereon is placed upon the end disk 6, so that the flanges extend inwardly, see Fig. 11, instead of outwardly as in Fig. 3 of the preferred form.

The ends of the tube or shell are crimped inwardly to hold the assembly encased within the outer shell 1 in a permanent hermetical sealing of the same.

The numerals in Figures 17 to 25 are also analogous, with the exception of the end closure 7 provided with grooves 8 adapted to interfit with the inner tube 2, and encased within the outer tube 1; it should be borne in mind that this modified form is also adapted to be made from paper or pulp products. In which event the end closure sealing disk 6 may be superimposed upon the outer surface thereby providing a cavity at the end of the assemblage.

In this manner and as a result of this method, a paper container may be formed of heavy standard tubular preformed paper stock, adapted to packaging of dehydrated foods.

Having thus described the invention, what is claimed as new is:

1. A cartridge container having an inner tubular member with deformed walls, flanged disk end closures, seated upon the ends of the walls, end closure disks seated upon the flanged disks, the inner tubular member and disks being encased within an outer tubular member of greater length than the inner tubular member and disks, the ends of the outer tubular member crimped inwardly to self contain the assemblage in an enclosed encasement and seal the same.

2. A cartridge container having a corrugated inner tubular member, closure disks bearing upon the ends of said tubular member, flanged disks upon said closure disks; the inner tubular member and disks being encased by the outer tubular member of greater length than the inner tubular member and disks, the ends of the outer tubular member crimped inwardly, to self contain the assemblage in an enclosed encasement and seal the same.

3. A cartridge container; having an inner tubular member with flanged ends; end closure flanged disks seated upon flanges of the tubular member; end closure disks seated upon the flanged disks; the inner tubular member and disks being encased within an outer tubular member of greater length, the ends of the said outer tubular member crimped inwardly to enclose and encase the inner tubular member and disks, and self contain and seal the assemblage.

4. In a cartridge container, an inner tubular member provided with circumferential flanged ends, a peripherally flanged end closure disk having its plane face seated upon the circumferential flanges of the said inner tubular member, a plane closure disk seated upon the edges of the peripheral flange of the said end closure disk, an outer tubular member of greater length than the inner tubular member, enclosing the inner tubular member and closure disks, the ends of the outer tubular member crimped inwardly to self contain and seal the assemblage.

5. In a cartridge container, an inner tubular member, dish shaped end closures provided with an inner recess forming a groove for interfitting engagement with the ends of the inner tubular member; the dish shaped end closures serving as an interstice of an insulation area when covered with another end closure disk, the inner tubular member and end closure enclosed within an outer tubular member of greater length than the inner tubular member and end closures, the ends of the outer tubular member crimped inwardly to self contain, enclose and seal the assemblage.

6. In a cartridge container, an inner tubular member and end closure dish shaped disks provided with grooves adapted to interfit with the ends of said inner tubular member, the said inner tubular member and closure disks enclosed within an outer tubular member, the aforesaid members comprising an assemblage of inner and outer walls having interstices between the walls, for harboring insulating fluid, the ends of the outer tubular member of greater length than the inner tubular member and closure disks, and having its ends folded inwardly to self contain, enclose and seal the assemblage.

AUGUST G. LIEBMANN.